(12) United States Patent
Hubbard et al.

(10) Patent No.: US 10,940,677 B2
(45) Date of Patent: Mar. 9, 2021

(54) THERMOPLASTIC MEMBRANES CONTAINING EXPANDABLE GRAPHITE

(71) Applicant: FIRESTONE BUILDING PRODUCTS CO., LLC, Indianapolis, IN (US)

(72) Inventors: Michael J. Hubbard, Anderson, IN (US); Wensheng Zhou, Carmel, IN (US); Joseph Carr, Indianapolis, IN (US)

(73) Assignee: Firestone Building Products Co., LLC, Indianapolis, IN (US)

( * ) Notice: Subject to any disclaimer, the term of this patent is extended or adjusted under 35 U.S.C. 154(b) by 58 days.

(21) Appl. No.: 15/295,664

(22) Filed: Oct. 17, 2016

(65) Prior Publication Data

US 2017/0036430 A1    Feb. 9, 2017

Related U.S. Application Data

(63) Continuation of application No. 14/441,543, filed as application No. PCT/US2013/070490 on Nov. 18, (Continued)

(51) Int. Cl.
*B32B 27/20* (2006.01)
*B32B 27/08* (2006.01)
(Continued)

(52) U.S. Cl.
CPC ............ *B32B 27/205* (2013.01); *B32B 5/028* (2013.01); *B32B 9/007* (2013.01); *B32B 25/14* (2013.01); *B32B 27/065* (2013.01); *B32B 27/08* (2013.01); *B32B 27/12* (2013.01); *B32B 27/18* (2013.01); *B32B 27/306* (2013.01); *B32B 27/308* (2013.01); *B32B 27/32* (2013.01); *B32B 27/327* (2013.01); *E04D 5/06* (2013.01); *E04D 5/08* (2013.01); *E04D 5/10* (2013.01); *B32B 2260/046* (2013.01); *B32B 2260/048* (2013.01); *B32B 2264/102* (2013.01);
(Continued)

(58) Field of Classification Search
None
See application file for complete search history.

(56) References Cited

U.S. PATENT DOCUMENTS 6,021,620 A * 2/2000 Vermilion ........... E04D 13/1407
52/199
6,451,897 B1   9/2002 Niyogi
(Continued)

FOREIGN PATENT DOCUMENTS

CN    101624858 A    1/2010
JP    H11323148 A    11/1999
(Continued)

OTHER PUBLICATIONS

Office Action dated Aug. 2, 2018 for related CN Application No. 201710253265.6 (with English Translation).

*Primary Examiner* — Arti Singh-Pandey
(74) *Attorney, Agent, or Firm* — Thomas R. Kingsbury; Arthur M. Reginelli

(57) ABSTRACT

A multi-layered membrane comprising a first thermoplastic first layer and a second thermoplastic layer, where the second layer includes expandable graphite.

22 Claims, 2 Drawing Sheets

Related U.S. Application Data 2013, now abandoned, which is a continuation-in-part of application No. 13/799,763, filed on Mar. 13, 2013, now Pat. No. 9,045,904.

(60) Provisional application No. 61/727,354, filed on Nov. 16, 2012.

(51) Int. Cl.
| | | |
|---|---|---|
| B32B 27/18 | (2006.01) | |
| B32B 27/12 | (2006.01) | |
| B32B 5/02 | (2006.01) | |
| E04D 5/10 | (2006.01) | |
| B32B 27/06 | (2006.01) | |
| B32B 27/30 | (2006.01) | |
| B32B 25/14 | (2006.01) | |
| B32B 9/00 | (2006.01) | |
| B32B 27/32 | (2006.01) | |
| E04D 5/06 | (2006.01) | |
| E04D 5/08 | (2006.01) | |

(52) U.S. Cl.
CPC ..... *B32B 2264/108* (2013.01); *B32B 2266/04* (2013.01); *B32B 2274/00* (2013.01); *B32B 2307/3065* (2013.01); *B32B 2307/54* (2013.01); *B32B 2307/5825* (2013.01); *B32B 2307/72* (2013.01); *B32B 2307/7242* (2013.01); *B32B 2307/7246* (2013.01); *B32B 2419/06* (2013.01); *Y10T 428/31909* (2015.04); *Y10T 442/10* (2015.04)

(56) References Cited

U.S. PATENT DOCUMENTS

| | | |
|---|---|---|
| 8,530,034 B2 | 9/2013 | Khan et al. |
| 2005/0145139 A1 | 7/2005 | Khan et al. |
| 2006/0240224 A1 | 10/2006 | Khan et al. |
| 2010/0009152 A1 | 1/2010 | Lau et al. |
| 2010/0167013 A1 | 7/2010 | Cruz et al. |
| 2011/0011021 A1* | 1/2011 | LaVietes .................. C09D 5/18 52/408 |
| 2012/0244340 A1 | 9/2012 | Peng et al. |
| 2014/0373467 A1* | 12/2014 | Wang ...................... E04D 13/16 52/232 |

FOREIGN PATENT DOCUMENTS

| | | |
|---|---|---|
| JP | 2007160690 A | 6/2007 |
| JP | 2008126713 A | 6/2008 |
| RU | 2002106806 A | 9/2003 |
| WO | 2008045500 A2 | 4/2008 |

* cited by examiner

THERMOPLASTIC MEMBRANES CONTAINING EXPANDABLE GRAPHITE

This application claims the benefit of U.S. Non-Provisional application Ser. No. 14/441,543 filed on May 8, 2015, which is a National-Stage Application of PCT/US2013/070490 filed on Nov. 18, 2013, which is a Continuation-in-Part of U.S. Non-Provisional application Ser. No. 13/799,763 filed on Mar. 13, 2013 and now issued as U.S. Pat. No. 9,045,904, and claims priority to U.S. Provisional Application Ser. No. 61/727,354 filed on Nov. 16, 2012, which are incorporated herein by reference.

FIELD OF THE INVENTION

Embodiments of the present invention are directed toward thermoplastic compositions containing expandable graphite and the use of these compositions in roofing membranes.

BACKGROUND OF THE INVENTION

Flat or low-sloped roofs are often covered with polymeric membranes. Common among the membranes that have the mechanical properties needed to be technologically useful are thermoset membranes prepared with EPDM (ethylene-propylene-diene monomer) rubber, or thermoplastic membranes prepared with ethylene-propylene reactor copolymers or blends of polyethylene and polypropylene. These membranes typically contain carbon black and/or mineral fillers, which provide advantageous mechanical properties to the membranes.

Many roofs, especially flat or low-sloped roofs, are covered with a polymeric membrane. Polymeric membranes used in these applications include both thermoset membranes and thermoplastic membranes. Exemplary thermoset membranes include EPDM rubber. Thermoplastic membranes include PVC membranes and olefinic-based thermoplastic membranes. Olefinic-Based thermoplastic membranes offer unique advantages, including the ability to extrude the membrane, which facilitates manufacturing, and the ability to heat weld the membranes to form a continuous water barrier on the roofing surface.

Because the olefinic-based membranes are rich in hydrocarbon content, they may require significant flame retardants to pass industry and governmental flame and/or fire standards. The use of these flame retardants can have some drawbacks including cost and loss of mechanical properties.

SUMMARY OF THE INVENTION

Embodiments of the present invention provide a multi-layered membrane comprising a first thermoplastic first layer and a second thermoplastic layer, where the second layer includes expandable graphite.

Embodiments of the present invention provide multi-layered thermoplastic membrane comprising at least one thermoplastic layer having dispersed therein expandable graphite.

DETAILED DESCRIPTION OF ILLUSTRATIVE EMBODIMENTS

Figure 1:
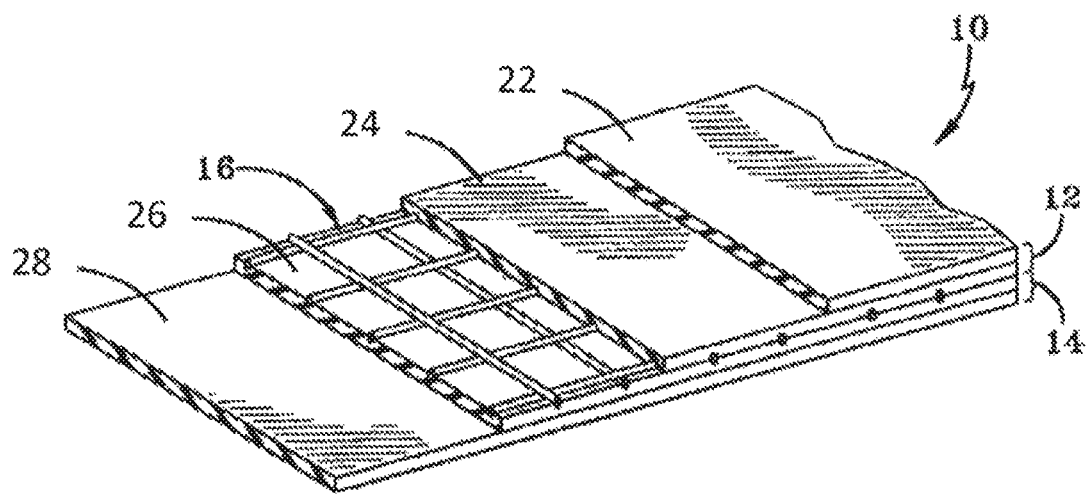
FIG. 1 is a perspective view of a multi-layered membrane including two co-extruded laminated layers according to embodiments of the present invention.

Embodiments of the present invention are based, at least in part, on the discovery of a thermally-processable composition that includes expandable graphite dispersed within a thermoplastic matrix. It has advantageously been discovered that these compositions can be used to fabricate one or more layers of multi-layered, single-ply membranes that are useful, among other things, as roofing membranes and geomembranes.

Expandable Graphite

In one or more embodiments, expandable graphite, which may also be referred to as expandable flake graphite, intumescent flake graphite, or expandable flake, includes intercalated graphite in which an intercallant material is included between the graphite layers of graphite crystal or particle. Examples of intercallant materials include halogens, alkali metals, sulfates, nitrates, various organic acids, aluminum chlorides, ferric chlorides, other metal halides, arsenic sulfides, and thallium sulfides. In certain embodiments of the present invention, the expandable graphite includes non-halogenated intercallant materials. In certain embodiments, the expandable graphite includes sulfate intercallants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation.

Commercially available examples of expandable graphite include HPMS Expandable Graphite (HP Materials Solutions, Inc., Woodland Hills, Calif.) and Expandable Graphite Grades 1721 (Asbury Carbons, Asbury, N.J.). Other commercial grades contemplated as useful in the present invention include 1722, 3393, 3577, 3626, and 1722HT (Asbury Carbons, Asbury, N.J.).

In one or more embodiments, the expandable graphite may be characterized as having a mean or average size in the range from about 30 μm to about 1.5 mm, in other embodiments from about 50 μm to about 1.0 mm, and in other embodiments from about 180 to about 850 μm. In certain embodiments, the expandable graphite may be characterized as having a mean or average size of at least 30 μm, in other embodiments at least 44 μm, in other embodiments at least 180 μm, and in other embodiments at least 300 μm. In one or more embodiments, expandable graphite may be characterized as having a mean or average size of at most 1.5 mm, in other embodiments at most 1.0 mm, in other embodiments at most 850 μm, in other embodiments at most 600 μm, in yet other embodiments at most 500 μm, and in still other embodiments at most 400 μm. Useful expandable graphite includes Graphite Grade #1721 (Asbury Carbons), which has a nominal size of greater than 300 μm.

In one or more embodiments of the present invention, the expandable graphite may be characterized as having a nominal particle size of 20×50 (US sieve). US sieve 20 has an opening equivalent to 0.841 mm and US sieve 50 has an opening equivalent to 0.297 mm. Therefore, a nominal particle size of 20×50 indicates the graphite particles are at least 0.297 mm and at most 0.841 mm.

In one or more embodiments, the expandable graphite may be characterized as having a carbon content in the range from about 75% to about 99%. In certain embodiments, the expandable graphite may be characterized as having a carbon content of at least 80%, in other embodiments at least 85%, in other embodiments at least 90%, in yet other embodiments at least 95%, in other embodiments at least 98%, and in still other embodiments at least 99% carbon.

In one or more embodiments, the expandable graphite may be characterized as having a sulfur content in the range from about 0% to about 8%, in other embodiments from about 2.6% to about 5.0%, and in other embodiments from about 3.0% to about 3.5%. In certain embodiments, the expandable graphite may be characterized as having a sulfur content of at least 0%, in other embodiments at least 2.6%, in other embodiments at least 2.9%, in other embodiments at least 3.2%, and in other embodiments 3.5%. In certain embodiments, the expandable graphite may be characterized as having a sulfur content of at most 8%, in other embodiments at most 5%, in other embodiments at most 3.5%.

In one or more embodiments, the expandable graphite may be characterized as having an expansion ratio (cc/g) in the range from about 10:1 to about 500:1, in other embodiments at least 20:1 to about 450:1, in other embodiments at least 30:1 to about 400:1, in other embodiments from about 50:1 to about 350:1. In certain embodiments, the expandable graphite may be characterized as having an expansion ratio (cc/g) of at least 10:1, in other embodiments at least 20:1, in other embodiments at least 30:1, in other embodiments at least 40:1, in other embodiments at least 50:1, in other embodiments at least 60:1, in other embodiments at least 90:1, in other embodiments at least 160:1, in other embodiments at least 210:1, in other embodiments at least 220:1, in other embodiments at least 230:1, in other embodiments at least 270:1, in other embodiments at least 290:1, and in yet other embodiments at least 300:1. In certain embodiments, the expandable graphite may be characterized as having an expansion ratio (cc/g) of at most 350:1, and in yet other embodiments at most 300:1.

In one or more embodiments, the expandable graphite, as it exists with the thermoplastic component of the thermoplastic membrane of the present invention, may be partially expanded. In one or more embodiments, the expandable graphite is not expanded, however, to a deleterious degree, which includes that amount or more of expansion that will deleteriously impact the ability to form the sheet product and/or the ability of the graphite to serve as flame retardant at desirable levels, which include those levels that allow proper formation of the sheet. In one or more embodiments, the expandable graphite is expanded to at most 60%, in other embodiments at most 50%, in other embodiments at most 40%, in other embodiments at most 30%, in other embodiments at most 20%, and in other embodiments at most 10% beyond its original unexpanded size.

In one or more embodiments, the expandable graphite may be characterized as having a pH in the range from about 1 to about 10; in other embodiments from about 1 to about 6; and in yet other embodiments from about 5 to about 10. In certain embodiments, the expandable graphite may be characterized as having a pH in the range from about 4 to about 7. In one or more embodiments, the expandable graphite may be characterized as having a pH of at least 1, in other embodiments at least 4, and in other embodiments at least 5. In certain embodiments, the expandable graphite may be characterized as having a pH of at most 10, in other embodiments at most 7, and in other embodiments at most 6.

In one or more embodiments, the expandable graphite may be characterized by an onset temperature ranging from about 100° C. to about 250° C.; in other embodiments from about 160° C. to about 225° C.; and in other embodiments from about 180° C. to about 200° C. In one or more embodiments, the expandable graphite may be characterized by an onset temperature of at least 100° C., in other embodiments at least 130° C., in other embodiments at least 160° C., and in other embodiments at least 180° C. In one or more embodiments, the expandable graphite may be characterized by an onset temperature of at most 250° C., in other embodiments at most 225° C., and in other embodiments at most 200° C. Onset temperature may also be interchangeably referred to as expansion temperature; and may also be referred to as the temperature at which expansion of the graphite starts.

Complementary Flame Retardants

In one or more embodiments, the expandable graphite may be used in conjunction with a complementary flame retardant. These complementary flame retardants may include any compound that increases the burn resistivity, particularly flame spread such as tested by UL 94 and/or UL 790, in the polymeric compositions of the present invention. Generally, useful flame retardants include those that operate by forming a char-layer across the surface of a specimen when exposed to a flame. Other flame retardants include those that operate by releasing water upon thermal decomposition of the flame retardant compound. Useful flame retardants may also be categorized as halogenated flame retardants or non-halogenated flame retardants.

Exemplary non-halogenated flame retardants include magnesium hydroxide, aluminum trihydrate, zinc borate, ammonium polyphosphate, melamine polyphosphate, and antimony oxide ($Sb_2O_3$). Magnesium hydroxide ($Mg(OH)_2$) is commercially available under the tradename Vertex™ 60, ammonium polyphosphate is commercially available under the tradename Exolite™ AP 760 (Clarian), melamine polyphosphate is available under the tradename Budit™ 3141 (Budenheim), and antimony oxide ($Sb_2O_3$) is commercially available under the tradename Fireshield™.

Examples of other complementary calcium borate, magnesium hydroxide, basic magnesium carbonate, aluminum trihydrate, zinc borate, gypsum, and mixtures thereof. In these or other embodiments, the complementary flame retardant includes colemanite, which is a borate mineral that is believed to include about 50-80% calcium borate.

Thermoplastic Matrix Polymers

In one or more embodiments, the thermoplastic matrix includes one or more thermoplastic polymers. In one or more embodiments, the thermoplastic polymers include a thermoplastic polyolefin. Other thermoplastic materials include thermoplastic vulcanizates, propylene-based elastomers, ethylene-based elastomers, thermoplastic elastomers (e.g. block copolymers), ethylene vinyl acetate, ethylene alkyl acrylates, and mixtures thereof.

Thermoplastic polyolefin polymers include polymers and copolymers including one or more mer units deriving from olefinic monomer. Blends of polymers may also be used. These blends include physical blends as well as reactor blends. In one or more embodiments, the thermoplastic polyolefin polymers may derive from recycled thermoplastic polyolefin membranes as described in copending application Ser. No. 11/724,768, which is incorporated herein by reference.

In one or more embodiments, the thermoplastic polyolefin polymers may include an olefinic reactor copolymer, which may also be referred to as in-reactor copolymer. Reactor copolymers are generally known in the art and may include blends of olefinic polymers that result from the polymerization of ethylene and α-olefins (e.g., propylene) with sundry catalyst systems. In one or more embodiments, these blends are made by in-reactor sequential polymerization. Reactor copolymers useful in one or more embodiments include those disclosed in U.S. Pat. No. 6,451,897, which is incorporated therein by reference. Reactor copolymers, which are also referred to as TPO resins, are commercially available under the tradename HIFAX™ (Lyondellbassel); these materials are believed to include in-reactor blends of ethylene-propylene rubber and polypropylene or polypropylene copolymers. In one or more embodiments, the in-reactor copolymers may be physically blended with other polyolefins. For example, in reactor copolymers may be blended with linear low density polyethene.

In other embodiments, the thermoplastic polyolefin polymers may include one or more polyolefins such as, but not limited to, propylene-based thermoplastic polymers, plastomers, and/or ethylene-based thermoplastic polymers. In one or more embodiments, the thermoplastic polymer may include a blend of olefinic polymers. Useful blends include those described in International Application No. PCT/US06/033522 which is incorporated herein by reference. For example, a particular blend may include (i) a plastomer, (ii) a low density polyethylene, and (iii) a propylene-based polymer.

In one or more embodiments, propylene-based polymers may include polypropylene homopolymer or copolymers of propylene and a comonomer, where the copolymer includes, on a mole basis, a majority of mer units deriving from propylene. In one or more embodiments, the propylene-based copolymers may include from about 2 to about 6 mole percent, and in other embodiments from about 3 to about 5 mole percent mer units deriving from the comonomer with the remainder including mer units deriving from propylene. In one or more embodiments, the comonomer includes at least one of ethylene and an α-olefin. The α-olefins may include butene-1, pentene-1, hexene-1, octene-1, or 4-methyl-pentene-1. In one or more embodiments, the copolymers of propylene and a comonomer may include random copolymers. Random copolymers may include those propylene-based copolymers where the comonomer is randomly distributed across the polymer backbone.

The propylene-based polymers employed in one or more embodiments of this invention may be characterized by a melt flow rate of from about 0.5 to about 15 dg/min, in other embodiments from about 0.7 to about 12 dg/min, in other embodiments from about 1 to about 10 dg/min, and in other embodiments from about 1.5 to about 3 dg/min per ASTM D-1238 at 230° C. and 2.16 kg load. In these or other embodiments, the propylene-based polymers may have a weight average molecular weight ($M_w$) of from about $1 \times 10^5$ to about $5 \times 10^5$ g/mole, in other embodiments from about $2 \times 10^5$ to about $4 \times 10^5$ g/mole, and in other embodiments from about $3 \times 10^5$ to about $4 \times 10^5$ g/mole, as measured by GPC with polystyrene standards. The molecular weight distribution of these propylene-based copolymer may be from about 2.5 to about 4, in other embodiments from about 2.7 to about 3.5, and in other embodiments from about 2.8 to about 3.2.

In one or more embodiments, propylene-based polymers may be characterized by a melt temperature ($T_m$) that is from about 165° C. to about 130° C., in other embodiments from about 160 to about 140° C., and in other embodiments from about 155° C. to about 140° C. In one or more embodiments, particularly where the propylene-based polymer is a copolymer of propylene and a comonomer, the melt temperature may be below 160° C., in other embodiments below 155° C., in other embodiments below 150° C., and in other embodiments below 145° C. In one or more embodiments, they may have a crystallization temperature ($T_c$) of about at least 90° C., in other embodiments at least about 95° C., and in other embodiments at least 100° C., with one embodiment ranging from 105° C. to 115° C.

Also, these propylene-based polymers may be characterized by having a heat of fusion of at least 25 J/g, in other embodiments in excess of 50 J/g, in other embodiments in excess of 100 J/g, and in other embodiments in excess of 140 J/g.

In one or more embodiments, the propylene-based polymers may be characterized by a flexural modulus, which may also be referred to as a 1% secant modulus, in excess of 120,000 psi, in other embodiments in excess of 125,000, in other embodiments in excess of 130,000 psi, in other embodiments in excess of 133,000 psi, in other embodiments in excess of 135,000 psi, and in other embodiments in excess of 137,000 psi, as measured according to ASTM D-790.

Useful propylene-based polymers include those that are commercially available. For example, propylene-based polymers can be obtained under the tradename PP7620Z™ (Fina), PP33BF01™ (Equistar), or under the tradename TR3020™ (Sunoco).

In one or more embodiments, plastomers include ethylene-α-olefin copolymers. The plastomer employed in one or more embodiments of this invention includes those described in U.S. Pat. Nos. 6,207,754, 6,506,842, 5,226,392, and 5,747,592, which are incorporated herein by reference. This copolymer may include from about 1.0 to about 15 mole percent, in other embodiments from about 2 to about 12, in other embodiments from about 3 to about 9 mole percent, and in other embodiments from about 3.5 to about 8 mole percent mer units deriving from α-olefins, with the balance including mer units deriving from ethylene. The α-olefin employed in preparing the plastomer of one or more embodiments of this invention may include butene-1, pentene-1, hexene-1, octene-1, or 4-methyl-pentene-1.

In one or more embodiments, plastomers may be characterized by a density of from about 0.865 g/cc to about 0.900 g/cc, in other embodiments from about 0.870 to about 0.890 g/cc, and in other embodiments from about 0.875 to about 0.880 g/cc per ASTM D-792. In these or other embodiments, the density of the plastomers may be less than 0.900 g/cc, in other embodiments less than 0.890 g/cc, in other embodiments less than 0.880 g/cc, and in other embodiments less than 0.875 g/cc.

In one or more embodiments, the plastomer may be characterized by a weight average molecular weight of from about $7 \times 10^4$ to $13 \times 10^4$ g/mole, in other embodiments from about $8 \times 10^4$ to about $12 \times 10^4$ g/mole, and in other embodiments from about $9 \times 10^4$ to about $11 \times 10^4$ g/mole as measured by using GPC with polystyrene standards. In these or other embodiments, the plastomer may be characterized by a weight average molecular weight in excess of $5 \times 10^4$ g/mole, in other embodiments in excess of $6 \times 10^4$ g/mole, in other embodiments in excess of $7 \times 10^4$ g/mole, and in other embodiments in excess of $9 \times 10^4$ g/mole. In these or other embodiments, the plastomer may be characterized by a molecular weight distribution ($M_w/M_n$) that is from about 1.5 to 2.8, in other embodiments 1.7 to 2.4, and in other embodiments 2 to 2.3.

In these or other embodiments, the plastomer may be characterized by a melt index of from about 0.1 to about 8, in other embodiments from about 0.3 to about 7, and in other embodiments from about 0.5 to about 5 per ASTM D-1238 at 190° C. and 2.16 kg load.

The uniformity of the comonomer distribution of the plastomer of one or more embodiments, when expressed as a comonomer distribution breadth index value (CDBI), provides for a CDBI of greater than 60, in other embodiments greater than 80, and in other embodiments greater than 90.

In one or more embodiments, the plastomer may be characterized by a DSC melting point curve that exhibits the occurrence of a single melting point break occurring in the region of 50° C. to 110° C.

The plastomer of one or more embodiments of this invention may be prepared by using a single-site coordination catalyst including metallocene catalyst, which are conventionally known in the art.

Useful plastomers include those that are commercially available. For example, plastomer can be obtained under the tradename EXXACT™ 8201 (ExxonMobil); or under the tradename ENGAGE™ 8180 (Dow DuPont). In one or more embodiments, the low density polyethylene includes an ethylene-α-olefin copolymer. In one or more embodiments, the low density polyethylene includes linear low density polyethylene. The linear low density polyethylene employed in one or more embodiments of this invention may be similar to that described in U.S. Pat. No. 5,266,392, which is incorporated herein by reference. This copolymer may include from about 2.5 to about 13 mole percent, and in other embodiments from about 3.5 to about 10 mole percent, mer units deriving from α-olefins, with the balance including mer units deriving from ethylene. The α-olefin included in the linear low density polyethylene of one or more embodiments of this invention may include butene-1, pentene-1, hexene-1, octene-1, or 4-methyl-pentene-1. In one or more embodiments, the linear low density polyethylene is devoid or substantially devoid of propylene mer units (i.e., units deriving from propylene). Substantially devoid refers to that amount or less of propylene mer units that would otherwise have an appreciable impact on the copolymer or the compositions of this invention if present.

The linear low density polyethylene of one or more embodiments of this invention can be characterized by a density of from about 0.885 g/cc to about 0.930 g/cc, in other embodiments from about 0.900 g/cc to about 0.920 g/cc, and in other embodiments from about 0.900 g/cc to about 0.910 g/cc per ASTM D-792.

In one or more embodiments, the linear low density polyethylene may be characterized by a weight average molecular weight of from about $1 \times 10^5$ to about $5 \times 10^5$ g/mole, in other embodiments $2 \times 10^5$ to about $10 \times 10^5$ g/mole, in other embodiments from about $5 \times 10^5$ to about $8 \times 10^5$ g/mole, and in other embodiments from about $6 \times 10^5$ to about $7 \times 10^5$ g/mole as measured by GPC with polystyrene standards. In these or other embodiments, the linear low density polyethylene may be characterized by a molecular weight distribution ($M_w/M_n$) of from about 2.5 to about 25, in other embodiments from about 3 to about 20, and in other embodiments from about 3.5 to about 10. In these or other embodiments, the linear low density polyethylene may be characterized by a melt flow rate of from about 0.2 to about 10 dg/min, in other embodiments from about 0.4 to about 5 dg/min, and in other embodiments from about 0.6 to about 2 dg/min per ASTM D-1238 at 230° C. and 2.16 kg load.

The linear low density polyethylene of one or more embodiments of this invention may be prepared by using a convention Ziegler Natta coordination catalyst system.

Useful linear low density polyethylene includes those that are commercially available. For example, linear low density polyethylene can be obtained under the tradename Dowlex™ 2267G (Dow); or under the tradename DFDA-1010 NT7 (Dow); or under the tradename GA502023 (Lyondell).

In one or more embodiments, useful thermoplastic vulcanizates include those available under the tradename Uni-Prene (Teknor Apex)® and Santoprene (ExonMobil)®.

Useful ethylene alkyl-acrylates include those available under the tradename ELVALOY® (DuPont).

In one or more embodiments, block copolymers that may be used include styrene-butadiene block copolymers such as, but not limited to, styrene-butadiene-styrene block copolymers. These block copolymers may be blended with polyolefins such as polypropylene to form thermoplastic compositions that are useful in the practice of this invention.

In one or more embodiments, still other useful thermoplastic materials include propylene-based elastomers such as those available under the tradenames VISTAMAXX (Exxonmobil) and VERSIFY (Dow Chemical).

In one or more embodiments, the thermoplastic polymer or polymers forming the thermoplastic matrix in which the expandable graphite is dispersed has a melt temperature below 200° C., in other embodiments below 180° C., in other embodiments below 160° C., and in other embodiments below 150° C.

Other Ingredients

In addition to the expandable graphite and complementary flame retardants, the other additional ingredients may be dispersed in the one or more layers of thermoplastic polyolefin. These additional ingredients may include processing aids, stabilizers, and/or other fillers.

In one or more embodiments, processing aides include those compounds that can be added to the thermoplastic polymer composition to assist in processing or to extend the polymeric materials. In one or more embodiments, processing aids include those compounds that can reduce the viscosity and/or increase the flow of the thermoplastic polymer. Exemplary processing aids include metal salts of carboxylic acids including metal salts of naturally occurring fats and oils. In one or more embodiments, processing aids include calcium stearate and/or zinc stearate. In other embodiments, processing aids include processing oils such as those that are conventional in plastics and/or rubber processing.

In one or more embodiments, the stabilizers may include one or more of a UV stabilizer, an antioxidant, and an antiozonant. UV stabilizers include Tinuvin™ 622. Antioxidants include Irganox™ 1010. In one or more embodiments, carbon black is used as a stabilizer. Advantageously, the carbon black may be used for this purpose at levels of less than 5 wt. %, in other embodiments less than 3 wt. %, and in other embodiments less than 2 wt. %, based on the entire weight of the composition.

Amounts

In one or more embodiments, the amount of expandable graphite included within the thermoplastic polyolefin may be expressed with regard to the thermoplastic polyolefin. For example, in one or more embodiments, the compositions (and/or layers) may include greater than 3 parts by weight, in other embodiments greater than 4 parts by weight, in other embodiments greater than 5 parts by weight, in other embodiments greater than 10 parts by weight, and in other embodiments greater than 15 parts by weight expandable graphite per 100 parts by weight thermoplastic polyolefin. In these or other embodiments, the compositions (and or layers) may include less than 50 parts by weight, in other embodiments less than 40 parts by weight, and in other embodiments less than 30 parts by weight expandable graphite per 100 parts by weight thermoplastic polyolefin. In one or more embodiments, the compositions (and or layers) may include from about 3 to about 50 parts by weight, in other embodiments from about 4 to about 40 parts by weight, and in other embodiments from about 5 to about 30 par parts by weight expandable graphite per 100 parts by weight of the thermoplastic resin.

In one or more embodiments, the amount of expandable graphite included within the thermoplastic polyolefin may be expressed with regard to the total weight of the composition or layer. For example, in one or more embodiments, the compositions (and/or layers) may include greater than 3 percent by weight, in other embodiments greater than 4 percent by weight, in other embodiments greater than 5 percent by weight, in other embodiments greater than 10 percent by weight, and in other embodiments greater than 15 percent by weight expandable graphite based on the entire weight of the composition. In these or other embodiments, the compositions (and or layers) may include less than 50 percent by weight, in other embodiments less than 40 percent by weight, and in other embodiments less than 30 percent by weight expandable graphite based on the entire weight of the composition. In one or more embodiments, the compositions (and or layers) may include from about 3 to about 50 percent by weight, in other embodiments from about 4 to about 40 percent by weight, and in other embodiments from about 5 to about 30 par percent by weight expandable graphite based on the entire weight of the composition.

Likewise, the amount of complementary flame retardant included within the thermoplastic polyolefin may be expressed with regard to the thermoplastic polyolefin. For example, in one or more embodiments, the compositions (and or layers) may include greater than 3 parts by weight, in other embodiments greater than 5 parts by weight, and in other embodiments greater than 10 parts by weight complementary flame retardant per 100 parts by weight thermoplastic polyolefin. In these or other embodiments, the compositions (and or layers) may include less than 50 parts by weight, in other embodiments less than 40 parts by weight, in other embodiments less than 30 parts by weight, and in other embodiments less than 20 parts by weight complementary flame retardant per 100 parts by weight thermoplastic polyolefin.

Those skilled in the art will be able to readily select an appropriate amount of the other ingredients that may be used in the compositions of this invention. For example, the other ingredients such as the processing additives, UV stabilizers, and antioxidants may be used, although the amounts may vary, in amounts from about 0.1 to about 2 percent, in other embodiments from about 0.5 to about 1.5 percent, and in other embodiments from about 0.7 to about 1.3 percent, based on the total weight of the composition. In particular embodiments, the compositions including ground thermoset rubber include less than 10 weight percent, in other embodiments less than 8 weight percent, in other embodiments less than 5 weight percent, and in other embodiments less than 3 weight percent filler or flame retardant based on the entire weight of the thermoplastic polyolefin, ground rubber, and compatibilizer.

Multi-Layered Membrane

In one or more embodiments, a multi-layered membrane is provided wherein one or more layers of the membrane include expandable graphite. In particular embodiments, the layers are laminated to one another and therefore the membrane may be referred to as a laminate. In other embodiments, the layers are co-extruded to one another, and therefore the membranes may be referred to as co-extrudates. In yet other embodiments, the membranes may include co-extruded layers and laminated layers. The term laminates may therefore be employed to refer to the membranes regardless of whether they are formed by lamination and/or co-extrusion.

In one or more embodiments, the expandable graphite is dispersed throughout one or more layers of a multi-layered membrane wherein the layers in which the expandable graphite is dispersed include low-melt thermoplastic polymers. In one or more embodiments, these low-melt thermoplastic polymers have a melt temperature below the one or more thermoplastic polymers contained in other layers. Stated another way, the thermoplastic matrix in which the expandable graphite is dispersed has a melt temperature lower than the one or more layers that may be devoid or substantially devoid of expandable graphite. In particular embodiments, the melt temperature of the thermoplastic matrix in which the expandable graphite is dispersed is at least 5° C., in other embodiments at least 10° C., and in other embodiments at least 15° C. lower than one or more other layers of the multi-layered membrane.

In particular embodiments, the expandable graphite exists within the inner layer or layers of a multi-layered membrane. In other embodiments, the expandable graphite may exist in the lower layers of the multi-layered membrane, which include at least one of those layers that are below the layer that is exposed to the environment when the membrane is installed. In other embodiments, the top layer, which is the layer exposed to the environment when the membrane is installed on a roof, includes the expandable graphite. In yet other embodiments, the top layer is devoid of expandable graphite and is white or substantially white in color, while one or more of the lower layers include expandable graphite. This particular combination produces a membrane that is highly advantageous in several respects. First, the membrane exhibits improved fire performance as a result of the expandable graphite being located in one or more of the layers. And, second, by having a white exterior surface, the membrane can reflect infrared radiation and thereby reduce energy demands that may be required to cool the building that the membrane is covering. Moreover, the white exterior surface can reflect electromagnetic radiation (e.g., ultraviolet radiation) that can have a deleterious impact on the inner layer or lower layers.

Embodiments of the present invention may be described with reference to FIG. 1. Multi-layered membrane 10 includes upper layer 12 and lower layer 14. An optional reinforcing scrim 16 may be positioned between upper layer 12 and lower layer 14. In one or more embodiments, upper layer 12 and lower layer 14, together with optional scrim 16 sandwiched there between, may be prepared by using lamination techniques. In one or more embodiments, upper layer 12 may include expandable graphite. In other embodiments, lower layer 14 may include expandable graphite. In yet other embodiments, both upper layer 12 and lower layer 14 may include expandable graphite.

In one or more embodiments, upper layer 12 may include two or more sub-layers. As the skilled person will recognize, this may be accomplished by using co-extrusion techniques. For example, and as shown in FIG. 1, upper layer 12 includes top layer 22 and upper-middle layer 24. Also, and as shown in FIG. 1, lower layer 14 may include lower-middle layer 26 and bottom layer 28. In one or more embodiments, at least one of top layer 22, upper-middle layer 24, lower-middle layer 26, and bottom layer 28 includes expandable graphite in accordance with one or more embodiments of the present invention.

In particular embodiments, upper-middle layer 24 and optionally lower-middle layer 26 include expandable graphite. In these or other embodiments, bottom layer 28 includes expandable graphite. In still other embodiments, top layer 22 includes expandable graphite.

Figure 2:
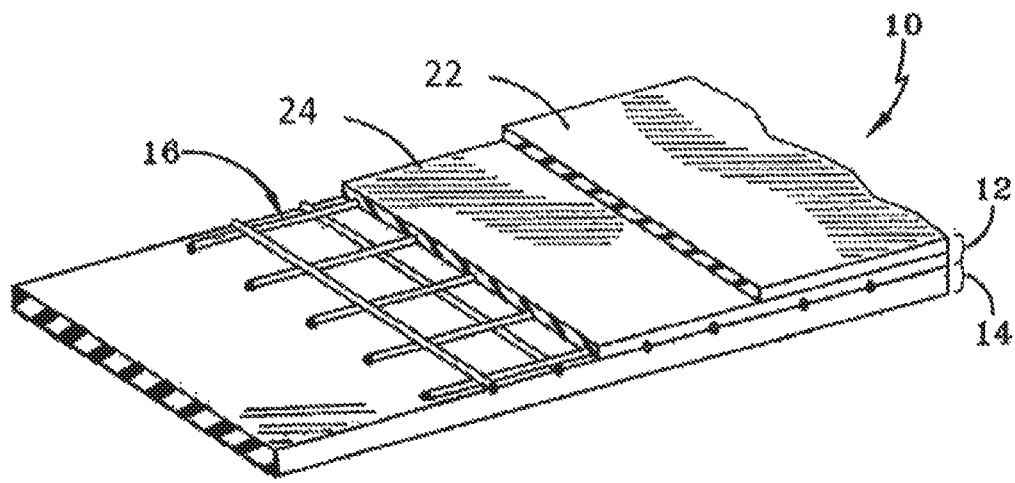
FIG. 2 is a perspective view of a multi-layered membrane including two laminated layers according to embodiments of the present invention.
Figure 3:
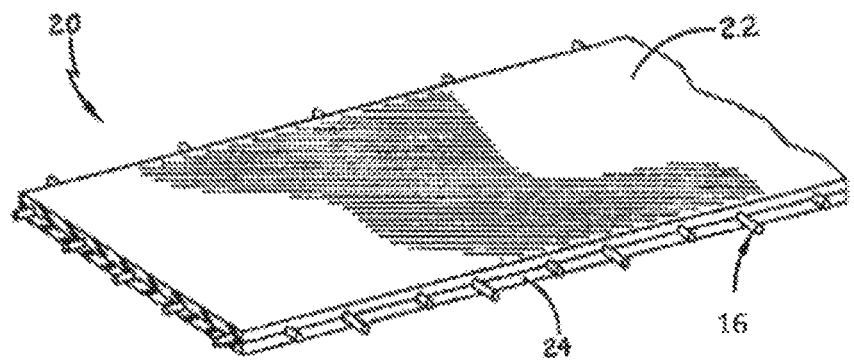
FIG. 3 is a perspective view of a laminate membrane according to embodiments of the present invention.

In yet other embodiments, as shown in FIG. 2, lower layer 14 is a single extruded layer that is laminated to co-extruded layer 12, which includes sub layers 22 and 24. In one or more embodiments, lower layer 14 includes expandable graphite.

In particular embodiments, top layer 22, which may be the layer of the laminate that is exposed to the environment when installed on a roof, is white or substantially white. In these or other embodiments, top layer 22 is devoid or substantially devoid of expandable graphite, while upper-middle layer 24 includes expandable graphite dispersed in a thermoplastic polyolefin according to the present invention. Besides the absence of the expandable graphite, top layer 22 may include thermoplastic polyolefin that is similar to or the same as the thermoplastic polyolefin in forming upper-middle layer 24. In other embodiments, upper-middle layer 24 may include a thermoplastic polyolefin that is distinct from top layer 22. Additionally, top layer 22 may include other constituents that are conventionally employed in thermoplastic roofing membranes. As is known in the art, these constituents may include antioxidants, UV stabilizers, and the like.

As those skilled in the art appreciate, upper or top layer 22 can be white or substantially white through the inclusion of white fillers. These white fillers may include clay, talc, mica, and/or titanium dioxide. For example, top layer 22 may include titanium dioxide in an amount of at least 3 percent by weight, in other embodiments at least 5 percent by weight, or in other embodiments at least 7 percent by weight, based on the total weight of the top layer. In these or other embodiments, top layer 20 may include less than 20 percent by weight, in other embodiments less than 15 percent by weight, and in other embodiments less than 12 percent by weight titanium dioxide, based on the total weight of the top layer.

In one or more embodiments, the white or substantially white layer exhibits a reflectivity of at least 65 percent, in other embodiments at least 80 percent, and in other embodiments at least 85 percent, where the reflectivity is a measure of the reflectants of visible light. In other embodiments, the reflectivity is a measure of visible and infrared electromagnetic radiation. In other embodiments, the reflectivity is a measure of the reflectants of visible light, infrared radiation, and UV radiation.

In one or more embodiments, the membranes of the present invention are characterized by a breaking strength, according to ASTM D751, of greater than 150 pounds force, in other embodiments greater than 220 pounds force, and in other embodiments greater than 350 pounds force. In these or other embodiments, the membranes of this invention are characterized by a tearing strength, according to ASTM D751, of greater than 45 pounds force, in other embodiments greater than 55 pounds force, in other embodiments greater than 100 pounds force, and in other embodiments greater than 150 pounds force.

Method of Making

In one or more embodiments, the compositions and membranes of the present invention may be prepared by employing conventional techniques. For example, the various ingredients can be separately fed into a reaction extruder and pelletized or directly extruded into membrane or laminate sheet. In other embodiments, the various ingredients can be combined and mixed within a mixing apparatus such as an internal mixer and then subsequently fabricated into membrane sheets or laminates.

In one or more embodiments, the membranes of the present invention may be prepared by extruding a polymeric composition into a sheet. Multiple sheets may be extruded and joined to form a laminate. A membrane including a reinforcing layer may be prepared by extruding at least one sheet on and/or below a reinforcement (e.g., a scrim). In other embodiments, the polymeric layer may be prepared as separate sheets, and the sheets may then be calandered or laminated with the scrim sandwiched therebetween to form a laminate. In one or more embodiments, the membranes of the present invention are prepared by employing co-extrusion technology. Useful techniques include those described in co-pending U.S. Ser. Nos. 11/708,898 and 11/708,903, which are incorporated herein by reference.

Following extrusion, and after optionally joining one or more polymeric layers, or optionally joining one or more polymeric layer together with a reinforcement, the membrane may be fabricated to a desired thickness. This may be accomplished by passing the membrane through a set of squeeze rolls positioned at a desired thickness. The membrane may then be allowed to cool and/or rolled for shipment and/or storage.

The polymeric composition that may be extruded to form the polymeric sheet may include the ingredients or constituents described herein. For example, the polymeric composition may include thermoplastic polyolefin and the expandable graphite. The ingredients may be mixed together by employing conventional polymer mixing equipment and techniques. In one or more embodiments, an extruder may be employed to mix the ingredients. For example, single-screw or twin-screw extruders may be employed.

In one embodiment, each of the polymeric ingredients (e.g., thermoplastic polyolefin) may be added to the extruder at the feed throat of the extruder. The filler and other ingredients (e.g., expandable graphite) that may be desirable may be added at the feed throat or within a subsequent stage or barrel of the extruder (e.g., downstream of the feed throat). This can be accomplished, for example, by using a side feeder. One or more of the polymeric ingredients may also be added downstream of the feed throat. This may include partial addition at the feed throat and partial addition downstream, or complete downstream addition of one or more polymeric ingredients.

In one or more embodiments, the thermoplastic polyolefin including the expandable graphite is processed at temperatures above the melting point, or in other embodiments above the processing temperature of the polyolefin or thermoplastic material used to form the sheet. In one or more embodiments, the thermoplastic is processes at temperatures in excess of 150° C., in other embodiments in excess of 160° C., and in other embodiments in excess of 170° C., in other embodiments in excess of 220° C., and in other embodiments in excess of 230° C. to obtain a free-flowing melted composition, but below the expansion temperature of the expandable graphite (e.g. temperatures below 250° C., in other embodiments below of 220° C., in other embodiments below 180° C., and in other embodiments below 180° C.). Once this is achieved, the composition can be conveyed downstream within the extruder under low shear such as may be achieved by using conveying elements in the absence or substantial absence of kneading elements. In one or more embodiments, the thermoplastic polyolefin, together with other optional ingredients besides the expandable graphite, are processed at higher temperatures and mixing energies, and then the expandable graphite is subsequently introduced to the composition, such as may occur by the addition of the expandable graphite at a downstream barrel. This also can occur under low shear conditions such as may be achieved by the use of conveying elements in the absence or substantial absence of kneading elements. In addition to the expandable graphite, oil can be added together with the expandable graphite. For example, a pre-blend of expandable graphite and oil can be injected into the extruder at a desirable downstream location.

INDUSTRIAL APPLICABILITY

The membranes of one or more embodiments of the present invention are useful in a number of applications. In one embodiment, the membranes may be useful for roofing membranes that are useful for covering flat or low-sloped roofs. In other embodiments, the membranes may be useful as geomembranes. Geomembranes include those membranes employed as pond liners, water dams, animal waste treatment liners, and pond covers.

Figure 4:
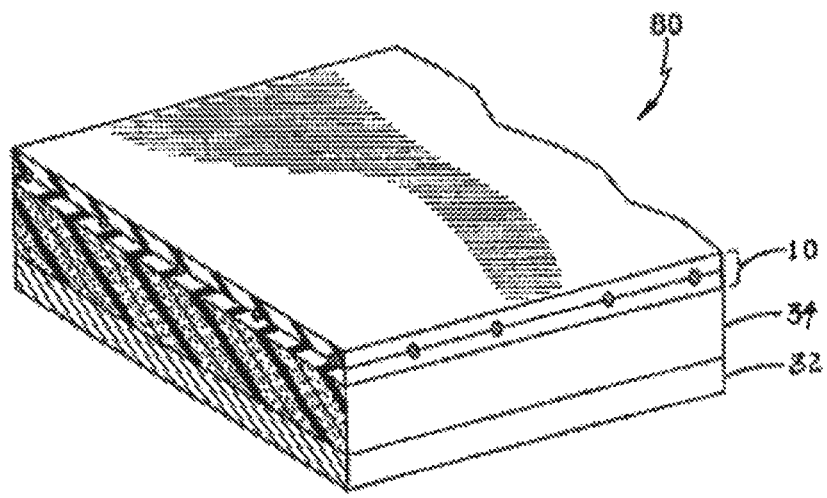
FIG. 4 is a perspective, cross sectional view of a roof assembly according to embodiments of the present invention.

As described above, the membranes of one or more embodiments of the present invention may be employed as roofing membranes. In one or more embodiments, these membranes include thermoplastic roofing membranes including those that may meet the specifications of ASTM D-6878-03. These membranes may be employed to cover flat or low/sloped roofs. These roofs are generally known in the art as disclosed in U.S. Ser. Nos. 60/586,424 and 11/343,466, and International Application No. PCT/US2005/024232, which are incorporated herein by reference. As shown in FIG. 4, a flat or low-sloped roof assembly 80 may include a roof deck 32, and optional insulation layer 34, and membrane 10 according to the present invention.

Practice of this invention is not limited by the selection of any particular roof deck. Accordingly, the roofing systems herein can include a variety of roof decks. Exemplary roof decks include concrete pads, steel decks, wood beams, and foamed concrete decks.

Practice of this invention is likewise not limited by the selection of any particular insulation board. Moreover, the insulation boards are optional. Several insulation materials can be employed including polyurethane or polyisocyanurate cellular materials. These boards are known as described in U.S. Pat. Nos. 6,117,375, 6,044,604, 5,891,563, 5,573,092, U.S. Publication Nos. 2004/01099832003/0082365, 2003/0153656, 2003/0032351, and 2002/0013379, as well as U.S. Ser. Nos. 10/640,895, 10/925,654, and 10/632,343, which is incorporated herein by reference.

In other embodiments, these membranes may be employed to cover flat or low-slope roofs following a re-roofing event. In one or more embodiments, the membranes may be employed for re-roofing as described in U.S. Publication No. 2006/0179749, which are incorporated herein by reference.

What is claimed is:

1. A multi-layered membrane comprising:
   i. a first thermoplastic layer formed from a first thermoplastic composition including a polyolefin, where the first thermoplastic composition has a melt temperature, where said first thermoplastic layer is white or substantially white in color, and where said first thermoplastic layer is devoid of expandable graphite; and
   ii. a second thermoplastic layer formed from a second thermoplastic composition, where said second thermoplastic composition has a melt temperature, where the second layer includes expandable graphite dispersed therein, where the second thermoplastic composition has a melt temperature below 150° C., and where the second thermoplastic composition has a melt temperature at least 10° C. below the melt temperature of the first thermoplastic composition.

2. The membrane of claim 1, where the membrane further includes a reinforcing fabric.

3. The membrane of claim 1, where the second layer includes at least 5 parts by weight expandable graphite per 100 parts by weight of the thermoplastic polymer.

4. The membrane of claim 1, where said thermoplastic polymer forming said thermoplastic polymer matrix having a melt temperature below 150° C. is ethylene vinyl acetate.

5. The membrane of claim 1, where said thermoplastic polymer forming said thermoplastic polymer matrix having a melt temperature below 150° C. is ethylene alkyl acrylate.

6. The membrane of claim 1, where said second layer including expandable graphite includes greater than 10 parts by weight expandable graphite per 100 parts by weight thermoplastic polymer.

7. The membrane of claim 1, where said second layer including expandable graphite includes greater than 15 parts by weight expandable graphite per 100 parts by weight thermoplastic polymer.

8. A multi-layered thermoplastic membrane comprising:
   i. an upper thermoplastic layer including a first sub layer and a second sub layer, each sub layer having a melt temperature, where the first sub layer of the upper thermoplastic layer is white or substantially white in color, and where said first sub layer of the upper thermoplastic layer is devoid of expandable graphite;
   ii. a lower thermoplastic layer including a first sub layer and a second sub layer, each sub layer having a melt temperature; and
   iii. a reinforcing fabric disposed between said upper and lower thermoplastic layers, where the reinforcing fabric is adjacent to said first sub layer of the lower thermoplastic layer and adjacent to the second sub layer of the upper thermoplastic layer, and where said first sub layer of said lower thermoplastic layer includes expandable graphite dispersed within a thermoplastic polymer matrix having a melt temperature below 150° C., and where said melt temperature of said first sub layer of said lower thermoplastic layer is at least 10° C. less than the melt temperature of said first sub layer of said upper thermoplastic layer.

9. The membrane of claim 8, where said first sub layer of said lower thermoplastic layer includes from about 5 to about 30 parts by weight expandable graphite per 100 parts by weight of the thermoplastic polymer.

10. The membrane of claim 8, where said second sub layer of said upper thermoplastic layer includes expandable graphite dispersed within a thermoplastic polymer matrix having a melt temperature of below 150° C.

11. The membrane of claim 8, where said thermoplastic polymer forming said thermoplastic polymer matrix having a melt temperature below 150° C. is ethylene vinyl acetate.

12. The membrane of claim 8, where said thermoplastic polymer forming said thermoplastic polymer matrix having a melt temperature below 150° C. is ethylene alkyl acrylate.

13. The membrane of claim 8, where said first sub layer of said lower layer includes greater than 10 parts by weight expandable graphite per 100 parts by weight thermoplastic polymer.

14. The membrane of claim 8, where said first sub layer of said lower layer includes greater than 15 parts by weight expandable graphite per 100 parts by weight thermoplastic polymer.

15. The membrane of claim 8, where the first sub layer of the upper thermoplastic layer includes a propylene-based plastic.

16. The membrane of claim 8, where the first sub layer of the upper thermoplastic layer includes a polyolefin.

17. A multi-layered thermoplastic membrane comprising:
 i. A top layer including a polyolefin, where the top layer is white or substantially white in color, and where the top layer is devoid of expandable graphite;
 ii. A reinforcing fabric located below said top layer;
 iii. A lower middle layer adjacent to and located below said reinforcing fabric, where said lower middle layer includes expandable graphite dispersed within a matrix formed by a thermoplastic polymer having a melt temperature of less than 150° C.; and
 iv. A bottom layer located below said lower middle layer, where said bottom layer includes a polyolefin.

18. The membrane of claim 17, where said lower middle layer and said bottom layer are coextruded.

19. The membrane of claim 17, further including an upper middle layer located below said top layer and above said reinforcing fabric.

20. The membrane of claim 19, where said top layer and said upper middle layer are coextruded.

21. The membrane of claim 20, where said upper middle layer includes expandable graphite dispersed within matrix formed by a thermoplastic polymer having a melt temperature of less than 150° C.

22. The membrane of claim 17, where said bottom layer is devoid of expandable graphite.

\* \* \* \* \*